United States Patent
Dries

(10) Patent No.: US 9,241,604 B2
(45) Date of Patent: Jan. 26, 2016

(54) ADJUSTABLE DISHWASHER CONDUIT VALVE SYSTEM

(71) Applicant: General Electric Company, Schenectady, NY (US)

(72) Inventor: John Edward Dries, Louisville, KY (US)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 13/740,499

(22) Filed: Jan. 14, 2013

(65) Prior Publication Data

US 2014/0196756 A1 Jul. 17, 2014

(51) Int. Cl.
| | | |
|---|---|---|
| *A47L 15/22* | (2006.01) |
| *A47L 15/42* | (2006.01) |
| *A47L 15/50* | (2006.01) |
| *B05B 11/00* | (2006.01) |
| *F16K 1/16* | (2006.01) |
| *F16K 1/18* | (2006.01) |
| *F16K 1/20* | (2006.01) |
| *F16K 1/50* | (2006.01) |
| *F16K 11/10* | (2006.01) |
| *F16K 11/12* | (2006.01) |
| *F16K 11/20* | (2006.01) |
| *F16K 11/22* | (2006.01) |
| *F16K 15/03* | (2006.01) |
| *F16K 15/18* | (2006.01) |

(52) U.S. Cl.
CPC ............. *A47L 15/22* (2013.01); *A47L 15/4221* (2013.01); *A47L 15/4223* (2013.01); *A47L 15/504* (2013.01); *B05B 11/007* (2013.01); *B05B 11/0062* (2013.01); *B05B 11/0064* (2013.01); *B05B 11/0072* (2013.01); *B05B 11/0075* (2013.01); *F16K 1/16* (2013.01); *F16K 1/18* (2013.01); *F16K 1/2021* (2013.01); *F16K 1/50* (2013.01); *F16K 11/105* (2013.01); *F16K 11/12* (2013.01); *F16K 11/205* (2013.01); *F16K 11/207* (2013.01); *F16K 11/22* (2013.01); *F16K 15/035* (2013.01); *F16K 15/036* (2013.01); *F16K 15/038* (2013.01); *F16K 15/181* (2013.01)

(58) Field of Classification Search
CPC ... A47L 15/22; A47L 15/504; A47L 15/4221; A47L 15/4223; B05B 11/0062; B05B 11/0064; B05B 11/007; B05B 11/0072; B05B 11/0075; F16K 1/16; F16K 1/18; F16K 1/2021; F16K 1/50; F16K 11/12; F16K 11/105; F16K 11/205; F16K 11/207; F16K 11/22; F16K 15/035; F16K 15/036; F16K 15/038; F16K 15/181
USPC ........................... 134/56 D, 57 D, 58 D, 198
See application file for complete search history.

(56) References Cited

U.S. PATENT DOCUMENTS

| | | | |
|---|---|---|---|
| 4,607,661 A * | 8/1986 | Wessels et al. ............ 137/512.1 |
| 5,392,810 A * | 2/1995 | Cooper et al. ............ 137/512.1 |
| 6,431,188 B1 | 8/2002 | Laszczewski, Jr. et al. |
| 7,055,537 B2 | 6/2006 | Elick et al. |
| 7,467,636 B2 | 12/2008 | Welch |
| 7,789,968 B2 | 9/2010 | Elick et al. |
| 2008/0145426 A1 | 6/2008 | Amundson et al. |
| 2008/0163904 A1* | 7/2008 | Hwang ......................... 134/198 |
| 2009/0090400 A1 | 4/2009 | Burrows et al. |

\* cited by examiner

*Primary Examiner* — Michael Barr
*Assistant Examiner* — Levon J Shahinian
(74) *Attorney, Agent, or Firm* — Dority & Manning, P.A.

(57) ABSTRACT

A spray arm assembly is provided that is configured for receiving a docking station at two different heights so as to, for example, accommodate an adjustable upper rack in a dishwasher appliance. The spray arm assembly includes a chamber and a check valve plate having two check valves with closure protrusions extending therefrom to provide this functionality.

20 Claims, 6 Drawing Sheets

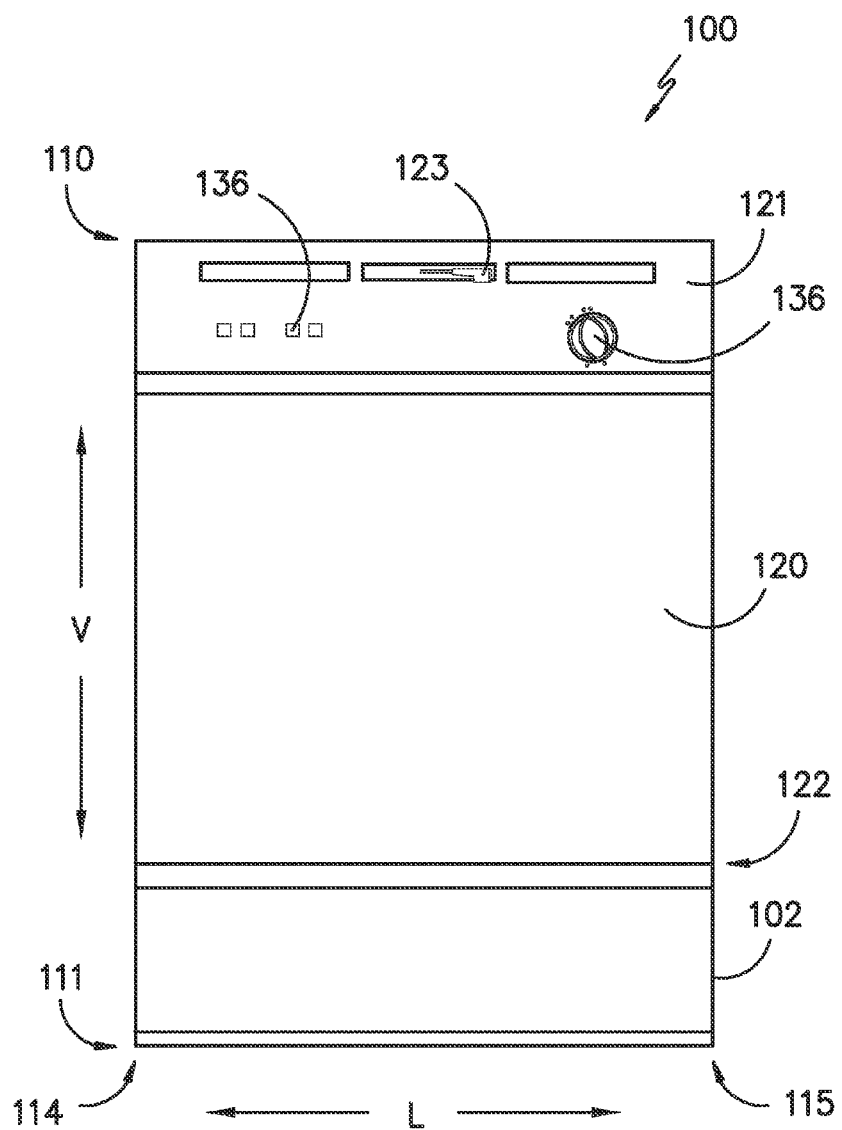
FIG. -1-

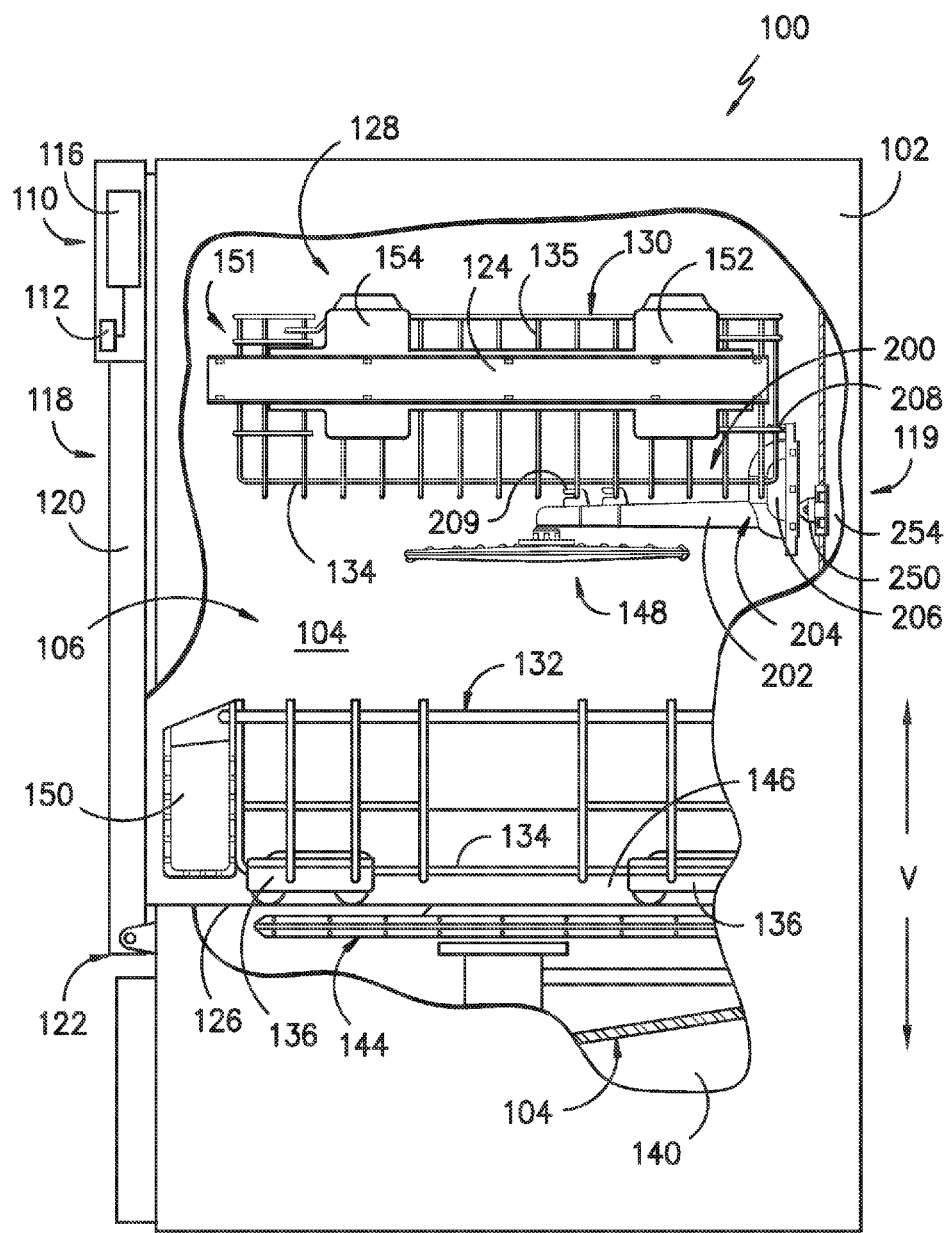
FIG. -2-

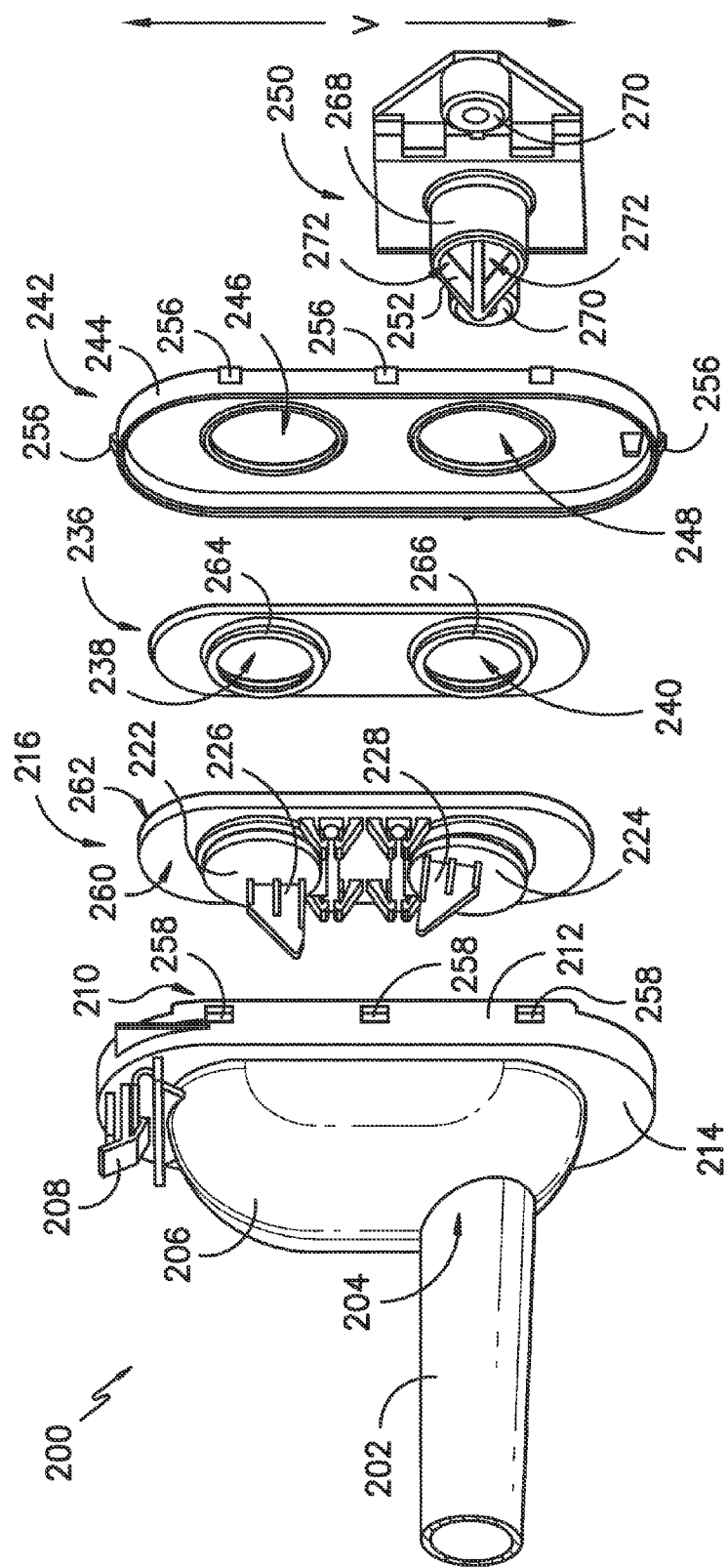
FIG. -3-

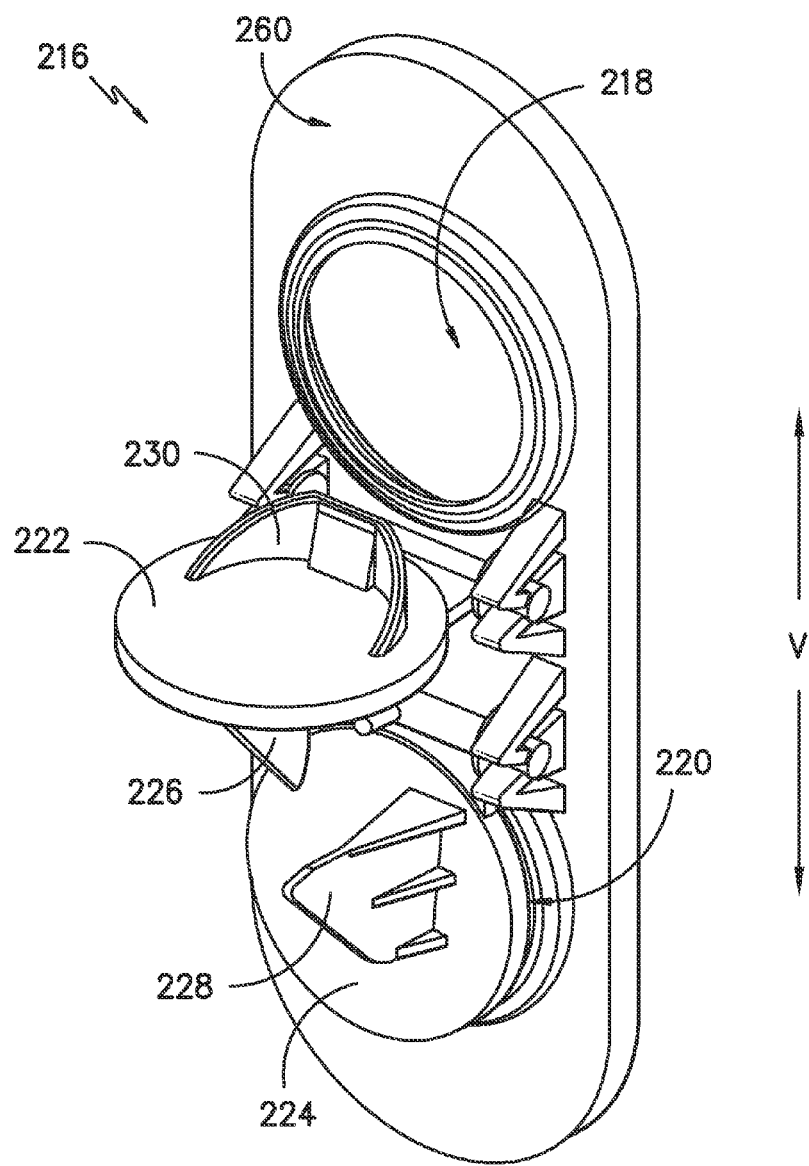
FIG. -4-

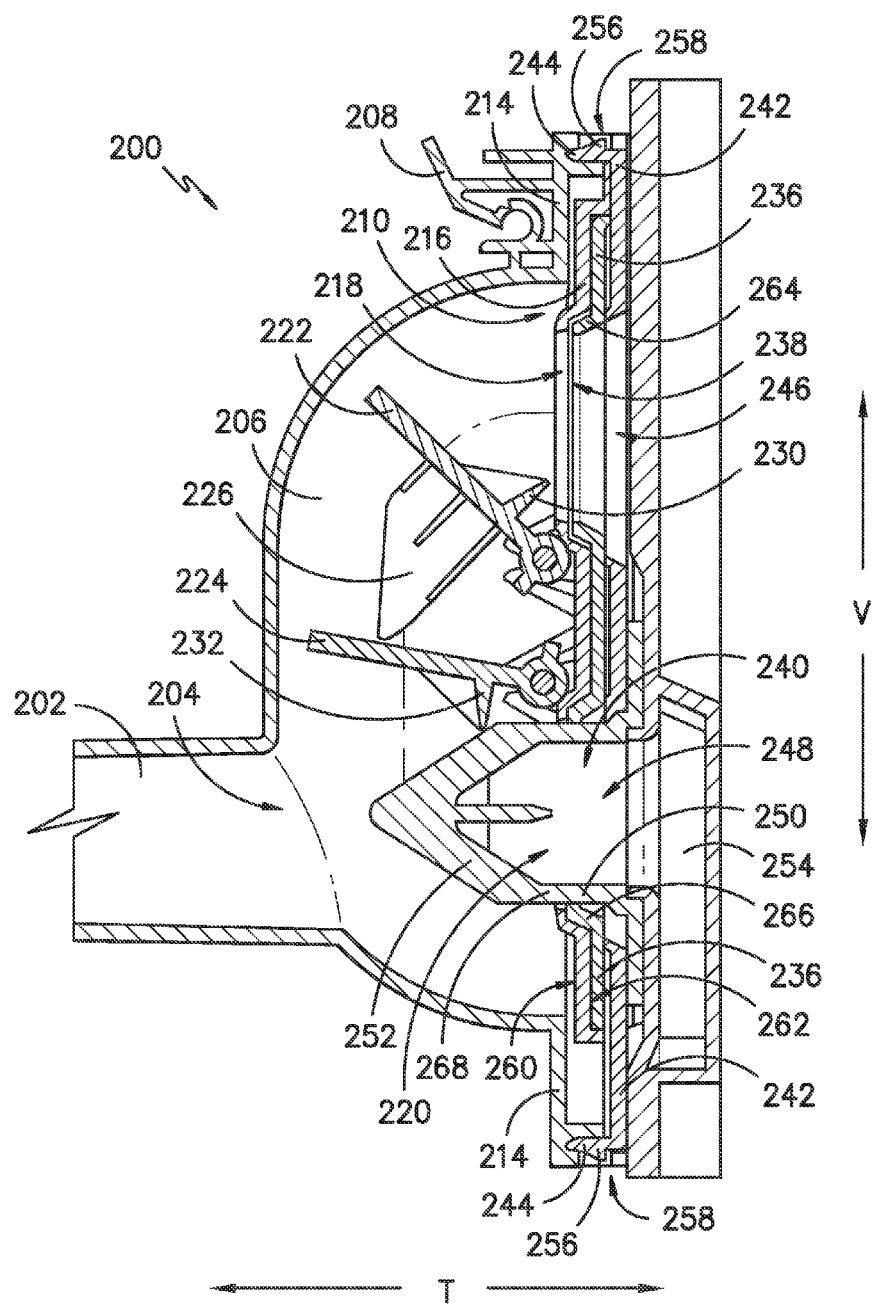
FIG. -5-

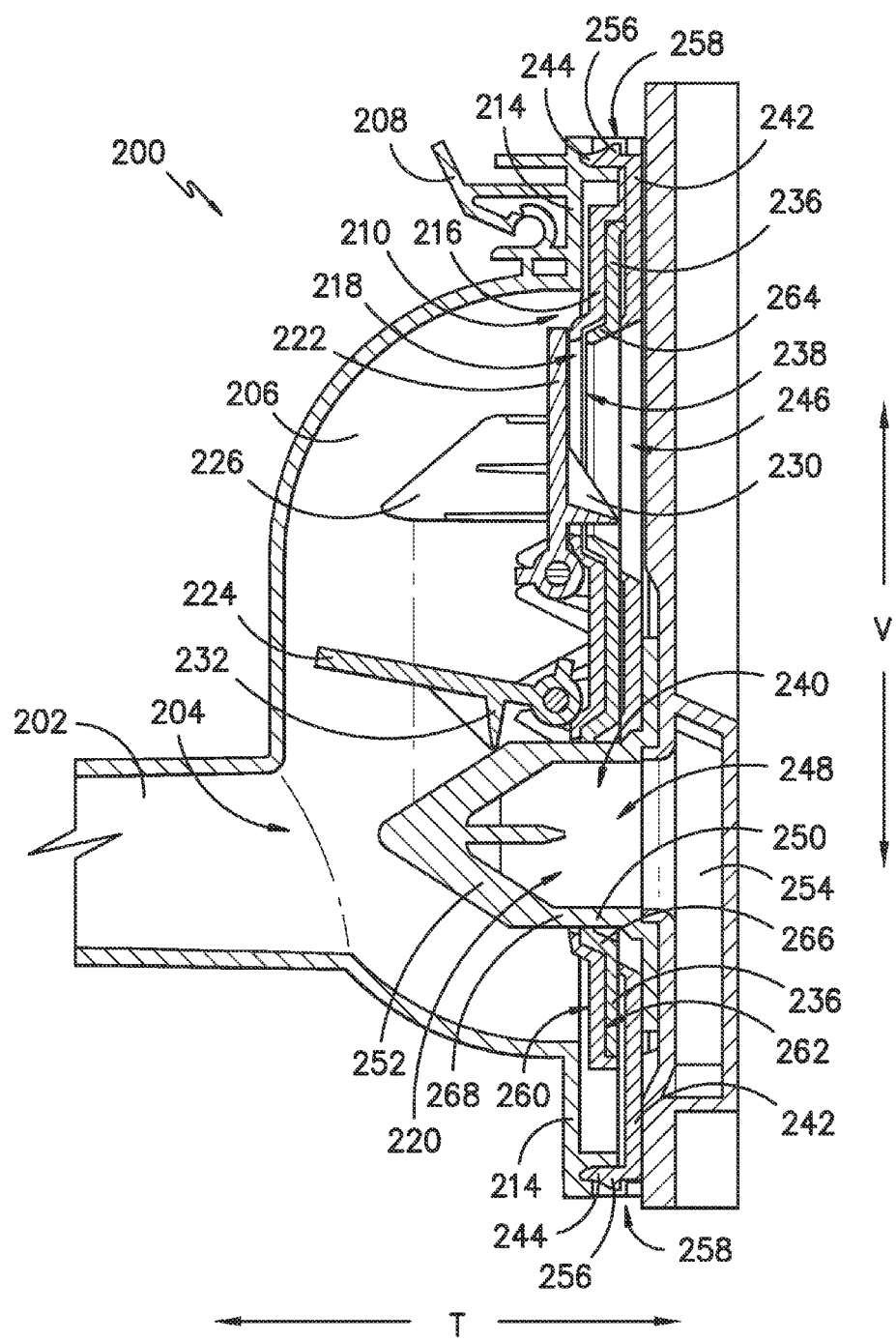
FIG. -6-

ADJUSTABLE DISHWASHER CONDUIT VALVE SYSTEM

FIELD OF THE INVENTION

The present disclosure relates generally to an adjustable conduit valve system for a spray arm assembly for use in an appliance, such as a dishwasher appliance.

BACKGROUND OF THE INVENTION

Dishwashing appliances generally include a tub defining a wash compartment wherein one or more rack assemblies, into which various articles may be loaded for cleaning, are positioned. Each rack may include features such as, e.g., tines that hold and orient the articles to receive sprays of wash and rinse fluids during the cleaning process. The articles to be cleaned may include a variety of dishes, cooking utensils, silverware, and other items.

A dishwashing appliance is also typically provided with one or more spray assemblies that can apply or direct wash fluid towards articles disposed within the rack assemblies in order to clean such articles. The spray assemblies can include a lower spray assembly mounted to the tub at a bottom of the wash compartment, a mid-level spray arm assembly mounted to an upper rack assembly, and a top spray assembly mounted to the tub at a top of the wash compartment.

The size of the articles to be cleaned can vary significantly. For example, glasses are available in a variety of different heights, dishes are manufactured with various diameters between large and small, and pots used for cooking can have different depths.

In order to accommodate the larger articles, the upper rack assembly of a dishwashing appliance can be provided with features for height adjustment of the assembly. Such adjustability allows for movement of the upper rack assembly along a vertical direction. By moving or lifting the upper rack to a higher vertical position, larger articles can be accommodated in e.g., a lower rack assembly positioned beneath the upper rack assembly. Conversely, by lowering the upper rack to a lower vertical position, larger articles can be accommodated in, e.g., the upper rack assembly.

In order to accommodate the height adjustment of the upper rack assembly, the mid-level spray arm assembly needs a construction that allows it to adjust to the various heights of the upper rack assembly. Valve assemblies have been proposed for accommodating the height adjustment of the rack assembly. For example, elastomeric valves have been used that rely on the elasticity of the valve to close. However, the elasticity of such materials can degrade over time and reduce the effectiveness of the valve closure.

Accordingly, a spray arm assembly having a conduit valve assembly that can accommodate more than one height would be beneficial. In particular, a spray arm assembly that can accommodate more than one height without necessarily the use of elastomeric materials would useful. Such an assembly that can be used repeatedly to properly secure a fluid connection between the spray assembly and a fluid supply for a height adjustable rack assembly of an appliance such as e.g., a dishwashing appliance would be particularly useful.

BRIEF DESCRIPTION OF THE INVENTION

The present disclosure provides a spray arm assembly configured for receiving a docking station at two different heights so as to, for example, accommodate an adjustable upper rack in a dishwasher appliance. The spray arm assembly includes a chamber and a check valve plate having two check valves with closure protrusions extending therefrom to provide this functionality. Additional aspects and advantages of the disclosure will be set forth in part in the following description, or may be apparent from the description, or may be learned through practice of the disclosure.

In one exemplary embodiment, the present disclosure provides a spray arm assembly, including a conduit having a first end, and a chamber positioned at the first end of the conduit. The spray arm assembly also includes a check valve plate, including an upper aperture, and a lower aperture, wherein the upper aperture is positioned above the lower aperture in a vertical direction. The check valve plate also includes an upper check valve pivotally attached to the check valve plate adjacent to the upper aperture. The upper check valve is rotatable between an open position and a closed position and includes an upper closure protrusion extending outwardly from the upper check valve. The check valve plate also includes a lower check valve pivotally attached to the check valve plate adjacent to the lower aperture. The lower check valve is rotatable between an open position and a closed position and includes a lower closure protrusion extending outwardly from the lower check valve, such that opening the lower check valve causes the upper closure protrusion, the lower closure protrusion, or both to move the upper check valve towards the closed position.

Another exemplary embodiment of the present disclosure provides an adjustable spray arm assembly for use in a dishwasher appliance, including a docking station, a conduit having a first end, and a chamber positioned at the first end of the conduit. The spray arm assembly also includes a check valve plate, the check valve plate including an upper aperture and a lower aperture. The upper aperture and the lower aperture are configured for selective receipt of the docking station, and the upper aperture is positioned above the lower aperture in a vertical direction. The check valve plate also includes an upper check valve pivotally attached to the check valve plate adjacent to the upper aperture. The upper check valve is rotatable between an open position and a closed position and includes an upper closure protrusion extending outwardly from the upper check valve. The check valve plate also includes a lower check valve pivotally attached to the check valve plate adjacent to the lower aperture. The lower check valve is rotatable between an open position and a closed position and includes a lower closure protrusion extending outwardly from the lower check valve, such that moving the lower check valve to the open position causes the upper check valve to move towards the closed position, or moving the upper check valve to the open position ensures the lower check valve is moved towards the closed position.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure plate of the present disclosure, including the best mode thereof, directed to one of ordinary skill in the art, is set forth in the specification, which makes reference to the appended figures, in which:

FIG. 1 provides a front view of an exemplary embodiment of a dishwashing appliance of the present disclosure.

FIG. 2 provides a side, sectional view of the exemplary dishwashing appliance of FIG. 1.

FIG. 3 provides an exploded view of an exemplary embodiment of a spray arm assembly and docking station of the present disclosure.

FIG. 4 provides a perspective view of an exemplary embodiment of a check valve plate of the present disclosure.

FIGS. 5 and 6 provide cross-sectional side views of an exemplary spray arm assembly and docking station of the present disclosure.

DETAILED DESCRIPTION OF THE INVENTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIGS. 1 and 2 depict a dishwashing appliance 100 according to an exemplary embodiment of the present disclosure. The dishwashing appliance 100 includes a cabinet 102 having a tub 104 therein that defines a wash compartment 106. Tub 104 also includes a door 120 hinged at its bottom 122 for movement between a normally closed configuration (shown in FIGS. 1 and 2) in which wash compartment 106 is sealed shut, e.g., for washing operation, and an open configuration, e.g., for loading and unloading of articles from dishwashing appliance 100.

Dishwasher appliance 100 defines a vertical direction V, a lateral direction L, and a transverse direction T. As may be seen in FIG. 1, dishwasher appliance 100 extends between a top 110 and a bottom 111 along vertical direction V and also extends between a first side 114 and a second side 115 along lateral direction L. As may be seen in FIG. 2, dishwashing appliance 100 also extends between a front 118 and a back 119 along transverse direction T. Vertical direction V, lateral direction L, and transverse direction T are mutually perpendicular and form an orthogonal directional system.

Slide assemblies 124 are mounted on opposing tub side walls 128 to support and provide for movement for upper rack 130. Lower guides 126 are all positioned in opposing manner of the sides of chamber 106 and provide a ridge or shelf for roller assemblies 136 so as to support and provide for movement of lower rack 132. Each of the upper and lower racks 130, 132 is fabricated into lattice structures including a plurality of elongated members 134 and 135 that extend in lateral L, transverse T, and/or vertical V directions. Each rack 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by slide assembly 124 and roller assemblies 136 that carry racks 130 and 132, respectively. A silverware basket 150 may be removably attached to the lower rack 132 for placement of silverware, small utensils, and the like, that are too small to be accommodated by the upper and lower racks 130, 132.

Dishwashing appliance 100 further includes a lower spray-arm assembly 144 that is rotatably mounted within a lower region 146 of wash chamber 106 so as to rotate in relatively close proximity to the lower rack 132. Middle spray-arm assembly 200 is fed by a fluid circulation assembly 254 for circulating, e.g., pressurized water and dishwashing fluid, in tub 104. Portions of fluid circulation assembly 254 may be located in a machinery compartment 140 of tub 104, as is generally recognized in the art.

A mid-level spray arm assembly 200 is located in an upper region of the wash chamber 106 and attaches to upper rack 130 using a snap-lock 208 and a plurality of hooks 209. In other exemplary embodiments, however, mid-level spray arm assembly may be attached to upper rack 140 by any other suitable means. As will be discussed in much greater detail below, with reference to FIGS. 3 through 6, mid-level spray arm assembly 200 is configured for receiving a docking station 250 when upper rack 130 is in a retracted position. Docking station 250 is in fluid connection with fluid circulation assembly 254, which may supply docking station 250 with, e.g., pressurized water or dishwashing fluid. Additionally, an upper spray or upper spray arm assembly (not shown) may be located above the upper rack 130.

In exemplary dishwashing appliance 100 provided by FIGS. 1 and 2, upper rack assembly 130 includes mounts 154 that connect upper rack 130 to slide assemblies 124. Mounts 154 allow for upper rack 130 to adjust to one or more different positions in vertical direction V. As such, mid-level spray arm assembly 200 must be capable of receiving docking station 250 at two or more different elevations. With this goal in mind, as discussed below, mid-level spray arm assembly 200 is provided with a chamber 206, positioned at a first end 204 of conduit 202, capable of receiving docking station 250 at two different elevations.

Dishwashing appliance 100 is further equipped with a controller 116 to regulate operation of dishwashing appliance 100. Controller 116 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. In the exemplary embodiment shown in FIGS. 1 and 2, controller 116 is positioned in the top of dishwashing appliance 100 above door 120.

It should be appreciated that the disclosure is not limited to any particular style, model, or configuration of dishwasher. The exemplary embodiment depicted in FIGS. 1 and 2 is for illustrative purposes only. For example, a different means for adjusting upper rack 130 may be provided, different locations may be provided for a user interface 112, different configurations may be provided for racks 130, 132, and other differences may be applied as well. Additionally, the present invention may be used with other appliances other than a dishwashing appliance as well.

Referring now to FIG. 3, an exploded side view of an exemplary embodiment of mid-level spray arm assembly 200 is provided. Chamber 206 is positioned at first end 204 of conduit 202 of mid-level spray arm assembly 200. Chamber 206 includes an opening 210, wherein a check valve plate 216 is positioned at opening 210. FIG. 4 provides a close-up perspective view of check valve plate 216. As shown, check valve plate 216 defines an upper aperture 218 and a lower aperture 220, with lower aperture 220 being positioned below upper aperture 218 in vertical direction V. Mid-level spray arm assembly 200 further includes an upper check valve 222 and a lower check valve 224. Upper check valve 222 is pivotally attached to check valve plate 216 below upper aperture 218, and is rotatable between an open position, as shown in FIG. 4, and a closed position, as shown in FIG. 3. Similarly, lower check valve 224 is pivotally attached to check valve plate 216 above lower aperture 220, and is rotatable between an open position (see FIGS. 5 and 6, discussed below) and a closed position, as shown in FIG. 3. When upper check valve 222 is in the closed position, it forms a fluid seal between chamber 206 and upper aperture 218. Likewise, when lower check valve 224 is in the closed position, it forms a fluid seal between chamber 206 and lower aperture 220.

Referring still to FIGS. 3 and 4, extending outwardly from upper check valve 222 and lower check valve 224 are upper closure protrusion 226 and lower closure protrusion 228, respectively. Upper and lower closure protrusions 226, 228 are configured for ensuring that when one check valve is opened, the other check valve is moved towards the closed position. For example, opening lower check valve 224 causes upper closure protrusion 226, lower closure protrusion 228, or both to move upper check valve 222 towards the closed position. Conversely, opening upper check valve 222 ensures lower check valve 224 is moved towards the closed position. The benefits of this configuration will be discussed in greater detail below, with reference to FIGS. 5 and 6.

As shown in FIG. 3, mid-level spray arm assembly 200 further includes a gasket 236 positioned adjacent to check valve plate 216. Gasket 236 is comprised of a suitable resilient material, such as a natural or synthetic rubber. For this exemplary embodiment, gasket 236 includes an upper aperture 238 and a lower aperture 240. Upper and lower apertures 238, 240 in gasket 236 are configured such that when gasket 236 is positioned adjacent to check valve plate 216, upper aperture 238 aligns with upper aperture 218, and lower aperture 240 aligns with lower aperture 220. Additionally, for this exemplary embodiment, gasket 236 includes an upper lip 264 surrounding and concentric with upper aperture 238 and a lower lip 266 surrounding and concentric with lower aperture 240. Upper and lower lips 264, 266 extend outwardly from gasket 236, and are configured to extend into upper and lower apertures 218, 220, respectively, in check valve plate 216.

Mid-level spray arm assembly 200 further includes a closure plate 242. Closure plate 242 includes a rim 244 and an upper aperture 246 and a lower aperture 248. Rim 244 is configured for attaching closure plate 242 to chamber 206. Accordingly, chamber 206 includes an opening flange 214 and an opening fringe 212, wherein opening fringe 212 extends adjacent to opening 210 and attaches to rim 244 of closure plate 242. In this embodiment, gasket 236 is positioned between check valve plate 216 and closure plate 242 and a portion of check valve plate 216 is positioned proximate to opening flange 214 of chamber 206.

As shown, rim 244 includes a plurality of clips 256 and opening fringe 212 includes a plurality of slots 258, such that when rim 244 of closure plate 242 is positioned in opening 210 of chamber 206, clips 256 snap into slots 258. However, in alternative embodiments, rim 244 may attach to opening flange 214 by any suitable means. For example, in another exemplary embodiment, rim 244 may attach to opening flange 214 using a suitable adhesive.

Docking station 250 is in fluid connection with fluid circulation assembly 254 (see FIG. 2), such that docking station 250 may deliver pressurized fluid to mid-level spray arm assembly 200 when received within upper or lower apertures 218, 220. Docking station 250 includes a base protrusion 268 and a conical protrusion 252. Conical protrusion 252, is configured for aligning and/or guiding docking station 250 into upper or lower apertures 218, 220 of check valve plate 216, as is discussed below. Additionally, conical protrusion 252 includes a plurality of openings 272 to facilitate the flow of pressurized fluid. Docking station 250 is also provided with a plurality of mounting structures 270 to mount docking station 250 to fluid circulation assembly 254. In alternative embodiments, however, docking station 250 may have any other suitable configuration for guiding docking station 250 into upper or lower apertures 218, 220 of check valve plate 216 and delivering pressurized fluid.

Referring now to FIGS. 5 and 6, cross-sectional side views are provided of an exemplary embodiment of an assembled mid-level spray arm assembly 200 having received protrusion 252 of docking station 250 into lower aperture 220 of check valve plate 216. In FIG. 5, no pressurized fluid is delivered by docking station 250 to mid-level spray arm assembly 200, while in FIG. 6, pressurized fluid is being delivered by docking station 250 to mid-level spray arm assembly 200 such that upper check valve is held in a closed position by the pressure in chamber 206.

Upper aperture 218 and lower aperture 220 in check valve plate 216 are each configured for receiving conical protrusion 252 and base protrusion 268 of docking station 250. As such, base protrusion 268 of docking station 250 has a cross-sectional shape in vertical direction V and lateral direction L that is complementary with both upper aperture 218 and lower aperture 220. Additionally, conical protrusion 252 and base protrusion 268 extend in transverse direction T. Conical protrusion 252 has a conical shape that acts as a guidance structure when docking station 250 is being received within upper or lower apertures 218, 220. In alternative exemplary embodiments, however, any other suitable guidance structure may extend in transverse direction T from base protrusion 268 of docking station 250.

As is also shown in FIGS. 5 and 6, upper check valve 222 and lower check valve 224 also include an upper projection 230 and a lower projection 232, respectively. Upper projection 230 extends outwardly from upper check valve 222 in a direction opposite from upper closure protrusion 226, and lower projection 232 similarly extends outwardly from lower check valve 224 in a direction opposite from lower closure protrusion 228 (not shown due to the depth of the cross sectional view). Upper and lower projections 230, 232 interact with docking station 250 to ensure upper and lower check valves 222, 224 extend to a fully open position when docking station 250 is received within. More specifically, upper and lower projections 230, 232 extend such that docking station 250 pushes upper and lower check valves 222, 224 farther open than they would otherwise be without upper and lower projections 230, 232. This configuration allows the upper and lower closure protrusions 226, 228 to push either upper check valve 222 (when docking station 250 is received within lower check valve 224), or lower check valve 224 (when docking station 250 is received within upper check valve 222) closer to the closed position.

Mid-level spray arm assembly's 200 ability to receive docking station 250 at two different heights is demonstrated by FIGS. 5 and 6. When, for example, docking station 250 is received within lower aperture 220 of check valve plate 216, lower check valve 224 is moved to the open position, assisted by lower projection 232. While moving towards the open position, lower closure protrusion 228 (not shown due to depth of cross-sectional view), upper closure protrusion 226, or both move upper check valve 222 to a partially closed position, as shown in FIG. 5. Docking station 250 may then deliver pressurized fluid, supplied by fluid circulation assembly 254, to chamber 206. The flow of the pressurized fluid in chamber 206 then moves upper check valve 222 from the partially closed position shown in FIG. 5 to the closed position shown in FIG. 6. Once closed, the pressure in chamber 206 increases. The increased pressure ensures that upper check valve 222 remains closed and that a fluid seal is created between upper check valve 222 and check valve plate 216. Further, the increased pressure in chamber 206 presses check valve plate 216 against gasket 236, and gasket 236 against closure plate 242. The increased pressure therefore also ensures a fluid seal is created between check valve plate 216 and closure plate 242. For this exemplary embodiment, lip 266 of gasket 236 extends into lower aperture 220 so as to create a fluid seal between check valve plate 216 and docking station 250.

Alternatively, docking station 250 may be received within upper check valve 222 (not shown). In this instance, upper projection 230 ensures upper check valve 222 is in the open position, and upper closure protrusion 226, lower closure protrusion 228 (see FIG. 4), or both ensures lower check valve 224 is in a closed or partially closed position. The flow of pressurized fluid delivered by docking station 250 closes lower check valve 224, allowing the pressure in chamber 206 to increase. The increased pressure then ensures that lower check valve 224 remains closed and that a fluid seal is created between lower check valve 224 and check valve plate 216. Notably, upper and lower closure protrusions 226, 228 may not always actively move lower check valve 224 into a partially closed position when docking station 250 is received into upper check valve 222. This is simply due to the fact that the gravitational force on lower check valve 224 will generally do this naturally. However, upper and lower closure protrusions 226, 228 do ensure in this exemplary embodiment that lower check valve 222 is in at least a partially closed position, and is not, for example, stuck in an open position.

Whether docking station 250 is received within the upper or lower aperture 218, 220, of check valve plate 216, mid-level spray arm assembly 200 is configured such that it may tolerate slight variations in the height from which chamber 206 approaches docking station 250. The variations in height may result from, for example, varying load weights of upper rack assembly 130 (see FIG. 2). This functionality is provided by allowing the entire check valve plate 216 and gasket 236 to slide vertically in opening 210 of chamber 206 so as to accommodate docking station 250 approaching from slightly varying heights. More specifically, as conical protrusion 252 of docking station 250 is received within upper or lower aperture 218, 220, it may adjust check valve plate 216 and gasket 236 slightly upward or downward in vertical direction V. Then, once docking station 250 is received and the pressure in chamber 206 is increased, the check valve plate 216 and gasket 236 are pressed against closure plate 242 to create the required seal.

This functionality is further provided by upper and lower apertures 246, 248 in closure plate 242 being larger than upper and lower apertures 218, 220 in check valve plate 216. The size of upper and lower apertures 246, 248 in closure plate 242 define the amount of height variation allowed, as they are in a fixed position relative to chamber 206 (i.e., closure plate 242 may not slide vertically, like check valve plate 216 may). In alternative exemplary embodiments, however, mid-level spray arm assembly 200 of the present disclosure may be configured such that no tolerance is allowed in vertical direction V.

This written description uses examples to disclose the invention, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A spray arm assembly, comprising:
    a conduit having a first end;
    a chamber positioned at the first end of said conduit; and
    a check valve plate comprising:
        an upper aperture;
        a lower aperture, wherein said upper aperture is positioned above said lower aperture in a vertical direction;
    an upper check valve pivotally attached to said check valve plate adjacent to said upper aperture, said upper check valve being rotatable between an open position and a closed position and comprising an upper closure protrusion extending outwardly from said upper check valve; and
    a lower check valve pivotally attached to said check valve plate adjacent to said lower aperture, said lower check valve being rotatable between an open position and a closed position and comprising a lower closure protrusion extending outwardly from said lower check valve, such that opening said lower check valve causes the upper closure protrusion, the lower closure protrusion, or both to move the upper check valve towards the closed position.

2. A spray arm assembly as in claim 1, wherein said upper check valve further comprises an upper projection extending from said upper check valve in a direction opposite from the upper closure protrusion, and wherein said lower check valve further comprises a lower projection extending from said lower check valve in a direction opposite from the lower closure protrusion.

3. A spray arm assembly as in claim 1, wherein said chamber further comprises an opening, and wherein said check valve plate is positioned at said opening.

4. A spray arm assembly as in claim 3, wherein said chamber further comprises a fringe extending adjacent to said opening and a closure plate, wherein said closure plate comprises an upper aperture and a lower aperture and is affixed to said fringe.

5. A spray arm assembly as in claim 4, wherein said chamber further comprises an opening flange, and wherein a portion of said check valve plate is positioned proximate to a portion of said opening flange.

6. A spray arm assembly as in claim 4, further comprising a gasket positioned between said check valve plate and said closure plate.

7. A spray arm assembly as in claim 6, wherein the gasket comprises an upper aperture that aligns with said upper aperture in said check valve plate, and a lower aperture that aligns with said lower aperture in said check valve plate.

8. A spray arm assembly as in claim 4, wherein the upper aperture in the closure plate is larger than said upper aperture in said check valve plate, and wherein the lower aperture in the closure plate is larger than said lower aperture in said check valve plate.

9. A spray arm assembly as in claim 4, wherein said check valve plate may adjust vertically upward or downward relative to the closure plate.

10. An adjustable spray arm assembly for use in a dishwasher appliance, comprising:
   a docking station;
   a conduit having a first end;
   a chamber positioned at the first end of said conduit; and
   a check valve plate comprising:
      an upper aperture;
      a lower aperture, wherein said upper aperture and said lower aperture are configured for selective receipt of said docking station, and wherein said upper aperture is positioned above said lower aperture in a vertical direction;
      an upper check valve pivotally attached to said check valve plate adjacent to said upper aperture, said upper check valve being rotatable between an open position and a closed position and comprising an upper closure protrusion extending outwardly from said upper check valve; and
      a lower check valve pivotally attached to said check valve plate adjacent to said lower aperture, said lower check valve being rotatable between an open position and a closed position and comprising a lower closure protrusion extending outwardly from said lower check valve, such that moving the lower check valve to the open position causes the upper check valve to move towards the closed position, or moving the upper check valve to the open position ensures the lower check valve is moved towards the closed position.

11. A spray arm assembly for use in a dishwasher appliance as in claim 10, wherein said upper check valve further comprises an upper projection extending from said upper check valve in a direction opposite from the upper closure protrusion, and wherein said lower check valve further comprises a lower projection extending from said lower check valve in a direction opposite from the lower closure protrusion.

12. A spray arm assembly for use in a dishwasher appliance as in claim 10, further comprising a pressurized water supply in fluid connection with said docking station, such that when said docking station is received within said lower aperture, it may deliver pressurized liquid to said chamber and force said upper check valve into the closed position, and when said docking station is received within said upper aperture, it may deliver pressurized liquid to said chamber and force said lower check valve into the closed position.

13. A spray arm assembly for use in a dishwasher appliance as in claim 10, wherein said docking station comprises a conical protrusion extending from said docking station configured for guiding said docking station into said upper aperture or said lower aperture in said check valve plate.

14. A spray arm assembly for use in a dishwasher appliance as in claim 10, wherein said chamber further comprises an opening, and wherein said check valve plate is positioned at said opening.

15. A spray arm assembly for use in a dishwasher appliance as in claim 14, wherein said chamber further comprises a fringe extending adjacent to said opening and a closure plate, wherein said closure plate comprises an upper aperture and a lower aperture and is affixed to said fringe.

16. A spray arm assembly for use in a dishwasher appliance as in claim 15, wherein said chamber further comprises an opening flange, and wherein a portion of said check valve plate is positioned proximate to a portion of said opening flange.

17. A spray arm assembly for use in a dishwasher appliance as in claim 15, further comprising a gasket positioned between said check valve plate and said closure plate.

18. A spray arm assembly for use in a dishwasher appliance as in claim 17, wherein the gasket comprises an upper aperture that aligns with said upper aperture in said check valve plate, and a lower aperture that aligns with said lower aperture in said check valve plate.

19. A spray arm assembly for use in a dishwasher appliance as in claim 15, wherein the upper aperture in the closure plate is larger than said upper aperture in said check valve plate, and wherein the lower aperture in the closure plate is larger than said lower aperture in said check valve plate.

20. A spray arm assembly for use in a dishwasher appliance as in claim 15, wherein said check valve plate may adjust vertically upward or downward relative to said closure plate.

* * * * *